Jan. 16, 1940.                     D. P. MINARD                      2,187,277
                                  CAR REFRIGERATION
                                Filed Dec. 17, 1937             2 Sheets—Sheet 1
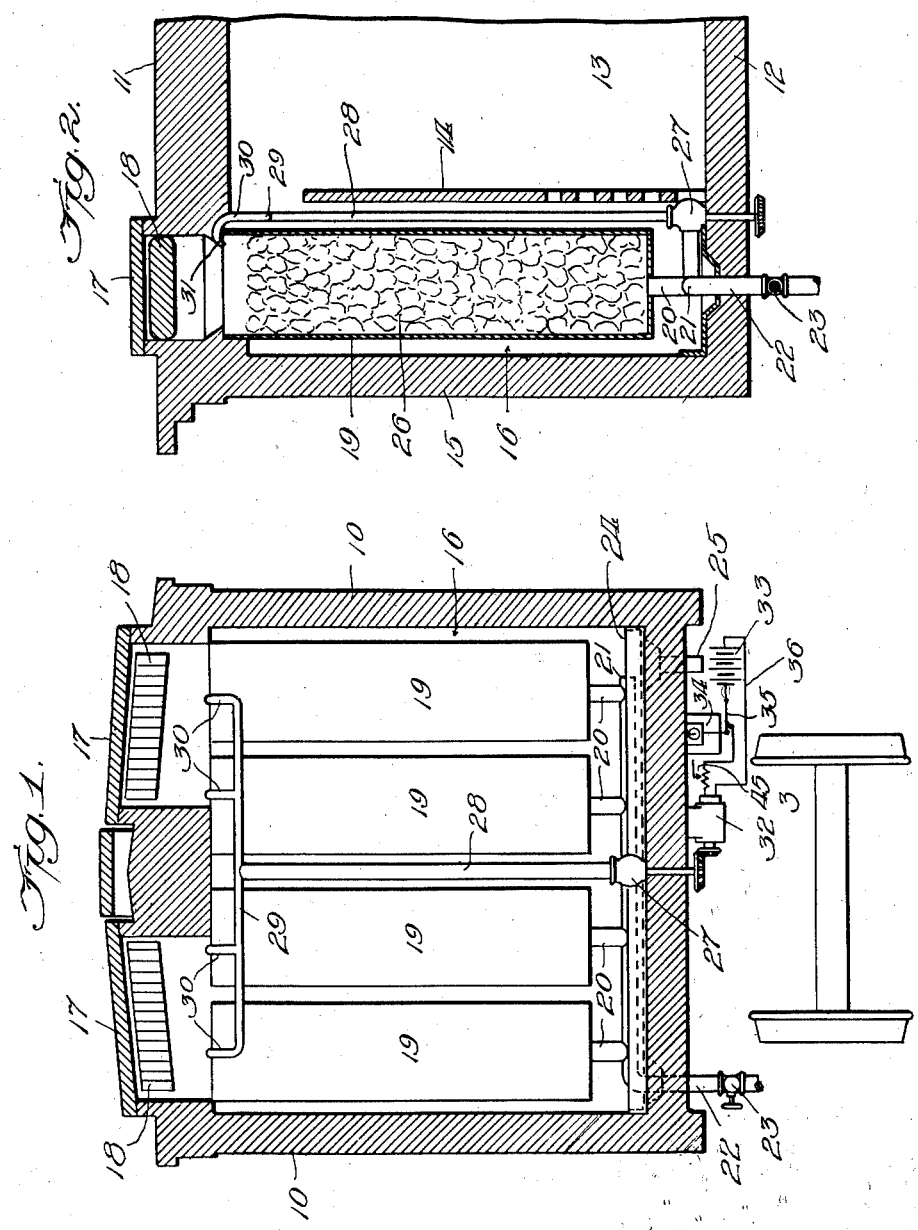
Inventor:
David P. Minard
by Davis, Lindsey, Smith & Shonts
Attys.

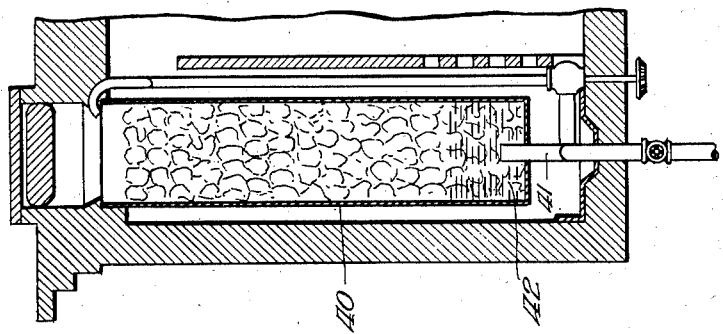
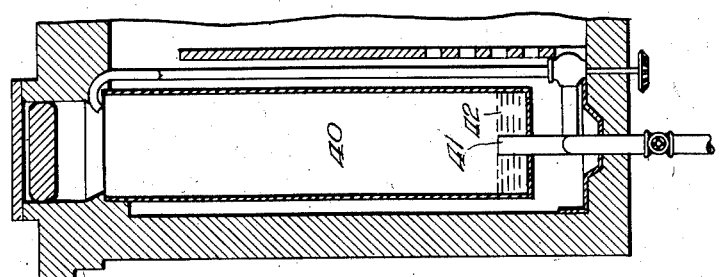
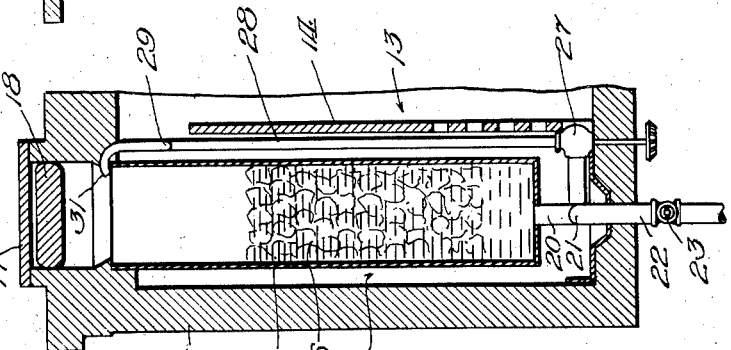
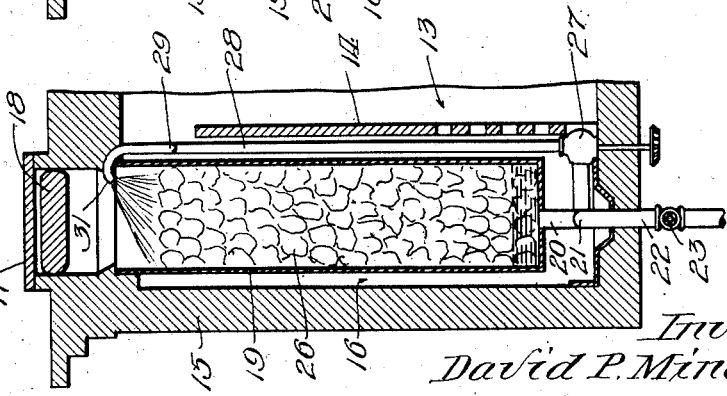

Patented Jan. 16, 1940

2,187,277

UNITED STATES PATENT OFFICE 2,187,277

CAR REFRIGERATION

David P. Minard, Chicago, Ill.

Application December 17, 1937, Serial No. 180,284

9 Claims. (Cl. 62—20)

My invention relates to car, and the like, refrigeration and it has to do especially with the utilization of an iced refrigerant for the refrigeration of cars, or the like, adapted for the transportation of perishable goods, such as foods, etc.

One of the objects of my invention is to provide an improved method of refrigerating cars and the like, and by which greater refrigeration efficiency is attained at a reduced cost.

Another object is to provide a method of the foregoing character by which variable temperature cycles are avoided and a substantially uniform temperature may be attained and maintained in the lading compartment of the car until the available refrigeration is practically expended. To this end, my invention contemplates a method by which the rate of refrigeration may be controlled in such a way as to provide for a substantially constant rate of heat absorption.

A further object is to provide a method of refrigeration by which an iced refrigerant is maintained at a substantially uniform refrigerating temperature and in a substantially uniform heat absorption contact with a surface over which a medium to be cooled is passed, whereby a substantially uniform refrigerated surface area is maintained over which air, or other medium, is passed for cooling purposes.

A further object is to provide a method involving the passage of air from a lading space over a refrigerated area and by which the refrigerated air is caused to circulate from a point of lowermost temperature directly back in the lading compartment, wherefore the air circulated back to the lading compartment may be of constantly uniform temperature until the refrigerant is practically spent.

Another object is to provide a method of refrigeration in which is utilized a refrigerant including crushed ice and salt, and by which a substantially uniform distribution of the salt throughout the mass is maintained.

A further object is to provide a method by which a desired specific temperature may be attained in a lading space in a minimum length of time for pre-chilling purposes, and by which such temperature may be maintained substantially constant during the "in-transit" period, regardless of variation in the heat radiation constant, and until the available refrigerant is practically spent.

Additional objects are to provide a method of refrigeration which is suitable for all-purpose car refrigeration; to provide a method utilizing crushed ice or crushed ice and salt as a refrigerant in which icing "in transit" is avoided; to provide a method of refrigeration by which radiation losses are reduced and the availability of cars for useful work is increased; to provide a method by which complete, useful employment of the refrigeration equipment is attained with a minimum of over-all expense; to provide a method of refrigeration by which practically all of the refrigerant initially charged into the car is available for useful work; to provide a method of refrigeration by which the use of auxiliary refrigeration equipment is avoided; and to increase the distance through which a refrigerator car may be shipped without attention by increasing the time of utilization of the refrigerant for refrigeration purposes.

Other objects and advantages will become apparent as this description progresses, and by reference to the accompanying drawings.

Generally, in practicing my invention, I employ a car having a refrigerating compartment through which air from a lading compartment is circulated by convection currents set up in such a way as to cause the air to enter the upper portion of the refrigeration compartment, pass downwardly along a refrigerated surface and return to the lading compartment from the lower or bottom portion of the refrigeration compartment. The refrigeration compartment may contain one or more receptacles or tanks so constructed and arranged as to present a substantially large air contact surface within the refrigerating compartment.

In further carrying out my invention, each refrigeration tank is first filled with a refrigerant taking the form of crushed ice, or crushed ice and salt, the specific character of the refrigerant depending upon the refrigerating temperatures to be produced and maintained within the lading compartment of the car. No brine or other liquid need be initially added to this mass and it, with the meltage resulting in the refrigeration action, may constitute the sole refrigerating agent.

It will be appreciated that meltage will occur within a comparatively short time, and as meltage occurs the liquid or brine formed gravitates to the bottom of the tank. This meltage continues to take place as the refrigeration process is carried on until, eventually, a sufficient amount of brine has been formed to carry all of the remaining ice in flotation. It has been found that when a tank is filled with crushed ice, the ice particles being of a size usually employed, about two-thirds of the tank volume is taken up by the ice mass and one-third by the voids formed in the ice mass. As heat is absorbed by the mass and melting occurs and the stage of ice flotation is reached, the mass in the tank still consumes approximately only two-thirds of the tank volume. It will be readily recognized from the foregoing that approximately two-thirds of the tank volume is always used for refrigeration purposes, the diminishing contact of the ice being compensated for by the contact of the meltage in the bottom of the tank until the flotation or equilibrium point is reached wherein the meltage provides the entire surface contact between the mass and the tank wall.

A rather low refrigeration efficiency, compared to that obtained with my invention, would result if, in the use of an iced refrigerant of the above character, no further treatment or control of the mass were provided. For example, it is a well-established physical principle that an ice and salt mixture drops immediately to a temperature approximately that of an ice and saturated brine mixture; and that, as soon as a stabilized condition in the mass is established, the only salt that remains effective is that within the region of influence of heat transmitted through the tank wall. As the meltage of the ice takes place along the tank wall (practically all melting takes place where the ice is nearest to the tank surface), the meltage action washes away the brine from the ice at that point and the refrigerant temperature naturally tends to rise toward that of pure ice or 32 degrees F. This action, if nothing else, would result in varied refrigeration effective only for a very short time, and partly because of that it is necessary to resort to re-icings of the car while the same is in transit and where distance to be traveled requires an in-transit period of approximately 24 hours or longer.

I have also found that in the use of prior iced refrigerants of the above character, as melting takes place between the ice and the tank wall, an insulating gap is formed between the main body of the ice mass and the tank surface within a comparatively short time so that the rate of heat absorption falls quite rapidly from that cause. This is another efficiency-lowering fault in prior refrigeration processes. Still further, as the meltage first occurs, the brine that gravitates to the bottom of the tank is of a highly concentrated nature, but as the meltage increases and the depth of the brine increases until full flotation of the ice occurs, the brine solution becomes less concentrated toward the top of the tank until a distinct stratified condition exists, with the brine at the bottom being of a more concentrated form and the brine at the top of diluted form. This stratification or variation in density and concentration of the brine produces a variable refrigerating contact area which is another efficiency-lowering fault of prior refrigeration processes. The refrigerant mass serves as an active refrigerant until substantially all of the crushed ice therein is melted. While convection currents may occur within the mass with a tendency to uniformize the density and concentration of the formed brine, I have found that the tendency toward this action is hindered by the ice mass in the brine so that the foregoing stratification action not only takes place, but the brine at the bottom of the tank, in the performance of its heat absorbing function gradually rises in temperature so that its heat absorbing characteristics become less and less efficient. Wherefore in prior iced refrigeration processes, the air passing back into the lading compartment last passes this rising temperature zone, so that some of the refrigeration effect produced by the contact of the air with the upper and cooler portion of the tank is lost, with consequent refrigeration loss through the air passed back to the lading compartment. All of this results in a gradual temperature rise in the lading compartment from a point of maximum refrigeration capabilities. This is highly objectionable under conditions of use where it is desirable to maintain a substantially uniform refrigerating temperature.

All of the foregoing faults of prior iced refrigeration processes are overcome in the use of my invention. More particularly, in carrying out my invention, the meltage gravitating to the bottom of a tank or other refrigerating compartment is recirculated back to the top of and through and along the side of the ice mass. In this way, the melting or shrinking of the top and side portions of the ice mass is caused to take place in a substantially uniform manner, without pyramiding effect, and the whole mass is allowed to settle uniformly to a state of equilibrium wherein substantially all of the voids in the original mass charge are filled by meltage. In this way, when a mixture of crushed ice and salt is employed, the refrigerating component of the salt mixture at the point of contact between the ice mass and the tank wall is always retained in that the loss of salt through meltage occurring at that point is compensated for by recirculating the salt brine formed by meltage. The recirculated brine serves the refrigeration purpose of the salt lost through meltage; wherefore, a refrigerant mass having the maximum refrigerant capabilities of the ice and salt mixture is maintained at all times at that point between the ice and tank wall where greatest heat absorption takes place. Still further, by thus recirculating the brine formed by the meltage, any tendency to form a gap of an insulating nature as above set forth is avoided, and there is always provided a direct refrigeration contact between the tank wall and the refrigerant mass at all times. In addition to the foregoing, recirculation of the meltage entirely avoids stratification of the meltage so that the formed brine is of substantially uniform concentration and density, throughout its depth, and the refrigerant mass is kept at a substantially uniform temperature until practically all of the ice is melted; whereby the entire air contact surface of the tank through which heat absorption takes place is kept at a substantially uniform temperature for substantially uniform heat absorption purposes. Hence, by circulating the air from the lading compartment through the top of the refrigerator compartment, downwardly along the refrigerating tank surface, and thence from the bottom of such compartment back into the lading compartment, a uniformly temperature-conditioned air flow may be maintained.

Further, in practicing my invention, I control the circulation of the brine in such a way as to regulate the lading compartment temperature, and through this control I am able to quickly produce a predetermined temperature within the lading compartment and to maintain therein a predetermined temperature until available refrigeration is practically expended. I accomplish this by recirculating the meltage or liquid at such times and in such quantities per unit of time as to provide, under predetermined temperature conditions, a sufficient thermal head to produce a certain cooling action.

In general, the function of car refrigeration may be divided into two parts,—pre-chilling and in-transit shipping. In the pre-chilling operation, it is desired to obtain an initial chill of the car to some predetermined opening temperature, and it is desired that this be accomplished in a minimum time to reduce radiation losses and to increase the availability of cars. To accomplish this, the rate of heat absorption (and consequently meltage) should be as high as practical and, consequently, the circulation of the liquid will be at a high rate. This circulation may be continuous or intermittent, all dependent upon the refrigeration temperature to be maintained under the existent outside or atmospheric temperature conditions. In the in-transit operation, the sole function of the refrigeration is to compensate for radiation losses. The recirculation in this case is dependent upon variables such as desired lading compartment temperature, outside or atmospheric temperature, available refrigeration capacity of the car, and duration of shipment. All such conditions may be fully met by varying the recirculation action to maintain a certain heat absorbing function in the refrigerant mass.

For pre-chilling purposes, I have found that the lading space of the car may be quickly reduced to a desired temperature (for example, 36 degrees F.) under normal outside temperature conditions (for example 70 to 85 degrees F.) by employing a recirculation cycle of approximately 15 minutes. By "recirculation cycle" I mean one period of recirculation and one period of rest, or the total time elapsing from the beginning of one period of recirculation to the time of beginning of the next period of recirculation. This recirculation cycle may involve variable periods of rest and recirculation. For example, the pre-chilling purpose may well be served under the foregoing conditions by recirculating at a rate, for example, of approximately one gallon per minute per tank, for a period of approximately 10 minutes with approximately 5-minute periods of rest. However, where the temperature to be maintained in the lading compartment is quite low, for example,—considerably below 32 degrees—recirculation may be carried out continuously so as to continuously condition the refrigerant mass for maximum heat absorption.

After the car has been properly pre-chilled and conditioned for in-transit operation, I, preferably, under the normal operating conditions above stated, and where normal ambient temperatures (70 to 85 degrees F.) are to be contended with, recirculate the brine at intervals, employing longer recirculation cycles. For example, where the normal conditions above set forth are to be met, excellent results may be obtained by employing recirculation cycles of approximately 20 minutes' time, 5 minutes of which time are devoted to recirculation (at a rate, for example, of approximately one gallon per minute per tank) and the remainder of the time to rest. Of course, as the temperature conditions to be met are increased and an increased thermal head or increased heat absorption is required, the recirculation cycle may be reduced with increased circulation periods; or vice versa, where reduced refrigeration requirements exist and a lesser thermal head need be maintained.

It will be appreciated that in the pre-chilling period, a substantial portion of the ice mass will be melted and a substantial amount of brine formed. While the mass thus existing at the end of a pre-chilling period may be used for in-transit purposes, it will be appreciated that, if that were done, the in-transit period of refrigeration would be reduced due to the fact that the refrigerant mass would be spent within a shorter length of time than if a fresh mass were employed. For that reason, and for the full attainment of the advantages of my invention, I, preferably, after the pre-chilling period, drain the brine from the refrigerant tank and refill the tank with a fresh mass of crushed ice or crushed ice and salt, as the circumstances require. After that is done, the recirculation action is carried out during the in-transit period for the accomplishment of the advantages above set forth.

In carrying out the recirculation action, the particular conditions to be met will determine the time when the recirculation action should begin. For example, under the normal temperature conditions above set forth, and after the pre-chilling operation has been carried out, it may not be necessary to initiate the recirculation action until after a period of about 3 hours' time. Ordinarily, after that time a sufficient amount of brine will have collected in the lower part of the individual tanks to readily accommodate an adequate recirculation action. However, I do not desire this time to be limiting in any sense, because the recirculation action, where only the brine formed by meltage of the initial ice mass is used, may begin just as soon as sufficient brine is formed to permit of a recirculation action, and further control may be effected by determining the length of the recirculation cycle and the length of the recirculation period thereof. In fact, in giving all of the foregoing examples, it is to be understood that they are merely illustrations of one mode of operation by which the advantages of my invention may be attained, and I do not intend that I shall be limited thereto since they may readily be varied to meet the various conditions of use without departing from my invention.

In some cases, it may be desirable to retain in or add to the refrigerant tank a sufficient amount of refrigerant liquid in addition to that provided, by meltage of a newly-added charge of refrigerant mass to support a recirculation action, so that the recirculation action may be carried out immediately upon the addition of a refrigerant mass to the refrigerating tank. This may best find an application in the pre-chilling operation, although it will not necessarily be required in that case unless the conditions of use particularly require immediate recirculation. In that event, the additional supply of liquid may be used only for pre-chilling purposes and the tank completely drained when it is conditioned for in-transit purposes; but it is to be understood that such additional supply of recirculating liquid may even be employed for in-transit purposes, if that should be found desirable.

In the drawings, I have illustrated somewhat diagrammatically two forms of structure that may be employed for carrying out my invention. In the drawings, Figure 1 is a transverse section through one end of a car embodying my invention;

Fig. 2 is a longitudinal section through the car of Fig. 1, illustrating the refrigerant tanks thereof initially filled with ice;

Fig. 3 is a view similar to Fig. 2 and illustrating a later stage of treatment wherein meltage has collected in the bottoms of the tanks;

Fig. 4 is a view similar to Figs. 2 and 3, except illustrating a later refrigeration stage wherein the entire ice mass is in flotation;

Fig. 5 is a view similar to Fig. 2, except illustrating an arrangement wherein a recirculating supply of brine is retained in the refrigerant tank and to which a fresh refrigerant charge is added; and Fig. 6 is a view similar to Fig. 5, except illustrating an initial iced condition of the structure shown therein.

Referring to Figs. 1 to 4 of the drawings, I may employ a refrigerating car having side walls 10, a top wall 11 and a bottom wall 12 defining a lading compartment 13. The end of the lading space 13 is defined by a bulkhead 14 which, together with the end wall 15 of the car, defines a refrigerating compartment 16, access to which is had through suitable hatches 17 in the adjacent part of the top wall 11 of the car. The bulkhead 14 is, preferably, spaced from the ceiling and floor of the car, or suitable openings are provided at those points, so that the bulkhead serves as an air-guiding baffle which is effective to permit the warm air in the car to circulate through the upper opening into contact with the tanks at the top of the car, and thereafter to retain the air thus circulated in intimate association with the exterior surfaces of the tanks to effect its cooling, as a result of which the cool air moves downwardly by gravity and returns to the lading space by moving outwardly away from the tanks below the bulkhead or through the bottom openings therein. The usual hatch plugs 18 are employed for sealing the hatch-closed openings leading to the compartment 16.

A battery of tanks 19 are mounted within the compartment 16 and each tank is provided with a bottom drainpipe 20 leading to a common drain header 21 having a discharge branch 22 controlled by a valve 23. A tray or drip pan 24 is located below the tanks 19 for preventing any discharge from the interior of the tanks and any condensation from the exterior thereof running back into the car interior. This pan 24 is provided with a drain pipe 25 for discharging any material collected in the former to the outside of the car.

The tanks are initially completely charged, as shown in Fig. 2, with either crushed ice or a mixture of crushed ice and salt, dependent upon the conditions of operation (temperature, distance to be traveled, etc.). When this is done, and ordinary crushed ice is used, about two-thirds of the tank volume is occupied by the ice mass 26, the remainder being taken up by the voids formed by the ice. The crushed ice also affords a certain area of contact with the tank wall through which heat absorption takes place. This area is substantially maintained (first by the ice, then ice and meltage, and finally meltage alone) throughout the use of the refrigerant. As the heat absorption and cooling action proceeds, meltage takes place and the brine or liquid formed thereby gravitates to the bottom of the tank until the condition shown in Fig. 3 is reached, wherein circulation of the brine may be initiated. Further meltage finally produces the condition shown in Fig. 4 wherein the ice is in full flotation.

For recirculation purposes, I may provide a pump 27 operably connected at its suction end to the drain header 21 and at its discharge end to a recirculation pipe or conduit 28 leading to an inlet header 29 having branches 30 leading to suitable nozzle structures 31 that discharge into the top portions of the tanks 19. The nozzles 31 may take any suitable form capable of effecting a substantially uniform distribution of the brine or liquid upon the top portion of the ice mass, which distribution may be accomplished by a spray, sprinkler or other suitable action. The pump 27 is, preferably, driven by a motor unit 32 supplied with power by battery installation 33 which may be carried in any suitable manner by the refrigerating car.

The operation of the motor-driven unit 32 is controlled by a time-operated control switch mechanism 34 which may take any suitable and well-known form and which is capable of being adjusted over a wide range of operating conditions. For example, the control mechanism 34 may be of any known clock-type employed in many instances for similar controls, the same including a switch member 35 actuated at predetermined times by suitable control mechanism to close an electric circuit 36 which includes the battery 33 and motor-driven unit 32. The control mechanism 34 may include a main time controlled switch for initiating the beginning of the circulating cycles and a relay-controlled, or the like, sub-switch (not illustrated in detail) for controlling the circulation cycles. With such an arrangement, when the equipment is set in operation, the motor-driven unit 32 will be initially cut in at a predetermined time and will thereafter cut in and cut out to provide predetermined controlled periods of recirculation (periods of pump operation) and periods of rest (periods of pump rest). Or, if desired, the control switch mechanism 34 may be cut out entirely by closing the circuit 36 in any desired manner so that the unit 32 will drive the pump 27 continuously for continuous recirculation operation.

In the use of the foregoing structure, and after the tanks have been completely filled with the desired refrigerant mass, the pump control switch mechanism 34 may be set to start the recirculation action immediately or after a predetermined time, this time depending upon the particular temperature and heat loss conditions to be taken care of. When the recirculation action is cut in, the pump will be actuated to recirculate the brine through the nozzles 31 to the top of the ice mass, and this action will continue for a predetermined time as determined by conditions hereinabove stated, when the switch control mechanism 34 will function to cut out the unit 32 and stop the pump. A predetermined rest period then occurs, depending upon the length of the recirculation cycle, at which time the pump will again be automatically cut in for recirculation purposes, this cycle taking place over and over again until the refrigerant is practically spent.

In this way, that portion of the refrigerant mass 26 in contact with the walls of the tanks 19 will always be maintained in a substantially uniform heat absorbing condition so that the air circulating from the lading compartment into the top of the refrigeration compartment 16 will last pass a zone of then-maximum heat absorption capacity and the air returning through the bottom openings of the bulkhead 15 will be cooled to the then-maximum cooling capacity of the then-conditioned refrigerant mass. By varying the refrigeration cycle, the heat absorption capabilities of the refrigerant mass may be varied in a definitely controlled manner and, therefore, this enables me to control the temperature of the air in the lading compartment 13 by control of recirculation. Once having determined temperature conditions to be met (radiation and other losses to be compensated for), I am able to maintain the desired temperature within the lading compartment by recirculating the brine as stated. The amount of brine recirculated within a given time may be varied by varying the capacity or operation of the pump 27. To this end I may employ a rheostat 45 of any desired form located in the motor circuit 36. Thus, by controlling the speed of the motor 32, the speed of the pump 27 and its capacity are varied. The rheostat 45 may be controlled manually or automatically by a thermostat so that the pump will have a predetermined capacity under certain car temperature conditions.

If it is desired to recirculate the brine immediately upon the charging of the tanks with the crushed ice, I may employ the arrangement illustrated in Figs. 5 and 6. The structure shown in those figures is the same as that previously described except that the tanks 40 are provided with drain pipes 41 which have an inner portion projecting upwardly within the tank a slight distance so that when the tank is drained a small amount of brine 42 (such as may be required for recirculation) is retained (Fig. 5). Suitable manhole means (not shown) may additionally be employed for completely draining and cleaning the tanks 40, in case that should become desirable. With this arrangement, the tanks 40 are completely charged with ice, in which event the brine is displaced somewhat, as indicated in Fig. 6, so that it extends to a greater height within the tank than shown in Fig. 5. In the further use of this arrangement, the recirculating pump and all other parts function similarly to the corresponding parts in the form shown in Figs. 1 to 3, inclusive. This arrangement is capable of producing all of the attendant advantages set forth in connection with the previous structure.

Also, if it should be desired to employ an arrangement wherein the tanks are filled with crushed ice and salt and the voids are initially completely filled with brine, my invention may well be adapted thereto for recirculation of the brine to avoid stratification of the refrigerant mass and to avoid any condition wherein, through lack of adequate convection currents within the mass, the lower portion of the mass gradually rises in temperature, with the consequent gradual rise in temperature in the lading space, through the air circulated from the lading space last passing a zone of lower heat absorption capacity.

While my invention is well adapted for the use of crushed ice and salt, it also has utility in the use of eutectic ice and crushed ice alone. Eutectic ice may well be employed as an alternate to crushed ice and salt, while crushed ice without salt may be employed where, for example, the temperature to be maintained in the lading space is not less than 36 degrees F. and where the distance to be traveled by the car is not so great. It will be seen that in the use of my invention with crushed ice alone, the consistency of the mass is maintained, stratification is avoided, insulating zones between the ice mass and the tank mass cannot be formed, and the full heat absorption capacity of the refrigerant mass may be utilized until available refrigeration is expended.

I believe the operation and advantages of my invention will be readily understood from the foregoing description. Through my invention, refrigeration efficiency is greatly increased; cost of refrigeration is materially reduced; all-purpose car refrigeration is provided for; the distance cars may be hauled is greatly increased through greater utilization of available refrigeration, and cars may be delivered at destination in a fully refrigerated condition; and a wide range of temperatures may be maintained (both below and above 32 degrees), thereby producing the most desirable refrigerant condition for foods and other perishables, and making possible an inexpensive manner of transportation of frozen foods and other materials that must necessarily be transported under conditions of temperature below 32 degrees F.

It will also be obvious from the foregoing that my invention may well be carried out with various forms of structure other than those hereinbefore described, all coming within the spirit and scope of my invention as defined by the claims that follow. For example, recirculation may be carried out in various ways other than by pumping. If desired, the brine may be motivated for recirculation purposes by use of compressed air, in which case I may employ an arrangement wherein I collect brine from the several tanks in a suitable compression chamber and then release the same under pressure to the several tanks in a uniformly distributed manner at periods of feed caused to take place at predetermined times and for a predetermined duration of time,—so that the brine is recirculated through the refrigerant mass in substantially the same manner as hereinabove described. Also, the recirculation cycle, however the manner of recirculation, may be controlled by temperature-control means of any well-known form; such as, for example, a control including a thermostat located in the lading compartment of the car adapted to cut in and cut out recirculation as required by the temperature condition in such compartment, thereby maintaining a substantially uniform temperature condition therein.

I claim:

1. The method of refrigerating a car or the like having a compartment to be cooled which comprises providing a tank over which air or other medium to be cooled is passed, substantially completely filling said tank with a meltable refrigerant mass of crushed ice and salt in unmelted condition, permitting meltage brine from said material to pass by gravity to a lower portion of said tank at the bottom of said mass where it is confined, recirculating said meltage from the lower portion of said mass directly back to the upper portion of said mass at substantially its withdrawal temperature, and thence therethrough in a substantially uniform manner, independently of the compartment to be cooled, and circulating air from said compartment against the outer top portion of said tank, thence downwardly therealong and back to said compartment.

2. The method of refrigerating a car or the like which comprises providing a tank having a surface swept by air to be cooled, adding a quantity of cooling liquid to said tank, adding to said liquid a quantity of crushed ice sufficient to completely fill said tank, the amount of liquid initially added being such that the liquid initially fills only the lower voids of the mass in said tank, withdrawing said liquid and any meltage from the lower portion of said mass and returning the same to the upper portion of said mass at substantially its withdrawal temperature.

3. The method of refrigerating a car or the like which comprises providing a tank having a surface swept by air to be cooled, adding a quantity of cooling liquid to said tank, adding to said liquid a quantity of crushed ice and salt sufficient to completely fill said tank, the amount of liquid initially added being such that the liquid initially fills only the lower voids of the mass in said tank, and variably controlling the temperature of said air by recirculating the liquid initially added to said tank together with brine formed by meltage of the mass through said mass, the time and rate of recirculation being variably controlled to provide a predetermined heat absorption rate between the mass and the surface of said tank swept by the air.

4. A cooling unit for a refrigerating car or the like which comprises a container adapted to be loaded to capacity with a meltable refrigerant mass including crushed ice, means for recirculating liquid from the bottom of said container directly back to the top thereof, and means for variably controlling the time and extent of operation of said recirculation means.

5. A cooling unit for a refrigerating car or the like which comprises a container adapted to be loaded to capacity with a meltable crushed ice refrigerant mass, means by which a predetermined quantity of liquid may be retained in the bottom of said container to initially fill the voids in the lowermost part of said mass only, and means for recirculating liquid in predetermined quantity from the bottom of said container directly to the top thereof, said container being adapted to so confine said liquid that it is passed back through the mass.

6. The method of refrigerating cars and the like having a compartment to be cooled which comprises, providing a refrigerating tank apart from said compartment having a surface along which air to be cooled is passed, filling said tank with an iced refrigerant, circulating a cooling liquid constituting a part of said refrigerant from the lower part of said tank directly to the upper part thereof for passage of the same through the remainder of the refrigerant, the directness of passage of said cooling liquid from the bottom to the top of said tank being such that a minimum of heat exchange action takes place, whereby the liquid withdrawn from the bottom of the tank is introduced into the top thereof at substantially its withdrawal temperature to thus provide a uniform temperature over the cooling surface of the tank, and causing such air to pass from said compartment, then along the cooled surface from the upper to the lower end thereof, and then back into the compartment of the car to be cooled.

7. The method of refrigerating cars and the like having a compartment to be cooled which comprises, confining a meltable refrigerant mass in a tank having an outer surface along which air to be cooled is passed, said mass having heat absorption contact with an inner surface of said tank; recirculating meltage from said mass directly back to the upper portion of said tank, at substantially its withdrawal temperature, and then through the mass along said inner surface for maintaining a substantially uniform heat absorption relation between the mass and said outer surface of the tank along which the air is passed; and circulating such air from said compartment along said outer surface and back to said compartment.

8. The method of refrigerating cars and the like having a compartment to be cooled, which comprises providing a refrigerating tank having a surface along which air to be cooled is passed, filling said tank with an iced refrigerant, circulating a cooling liquid constituting a part of said refrigerant from the lower part of said tank directly to the upper part thereof for passage of the same through the remainder of the refrigerant, said cooling liquid being so passed from the bottom to the top of said tank that the liquid withdrawn from the bottom of the tank is introduced into the top thereof at substantially its withdrawal temperature to thus provide a uniform temperature over the cooling surface of the tank, and causing such air to pass over the cooling surface of the tank and to the compartment to be cooled.

9. The method of refrigerating cars and the like having a compartment to be cooled, which comprises providing a refrigerating tank having a surface along which air to be cooled is passed, filling said tank with an iced refrigerant, circulating a cooling liquid constituting a part of said refrigerant from the lower part of said tank directly to the upper part thereof for passage of the same through the remainder of the refrigerant, said cooling liquid being passed from the bottom to the top of said tank through substantially the minimum distance between such points, whereby the liquid withdrawn from the bottom of the tank is introduced into the top thereof at substantially its withdrawal temperature, and causing such air to pass from said compartment along the cooled surface of said tank and back to the compartment of the car to be cooled.

DAVID P. MINARD.